Jan. 7, 1958 G. A. KWASNIEWSKI 2,818,750
POWER CONTROLLERS
Filed May 31, 1951 4 Sheets-Sheet 1

INVENTOR.
GEORGE A. KWASNIEWSKI
BY
*George H Fisher*
ATTORNEY

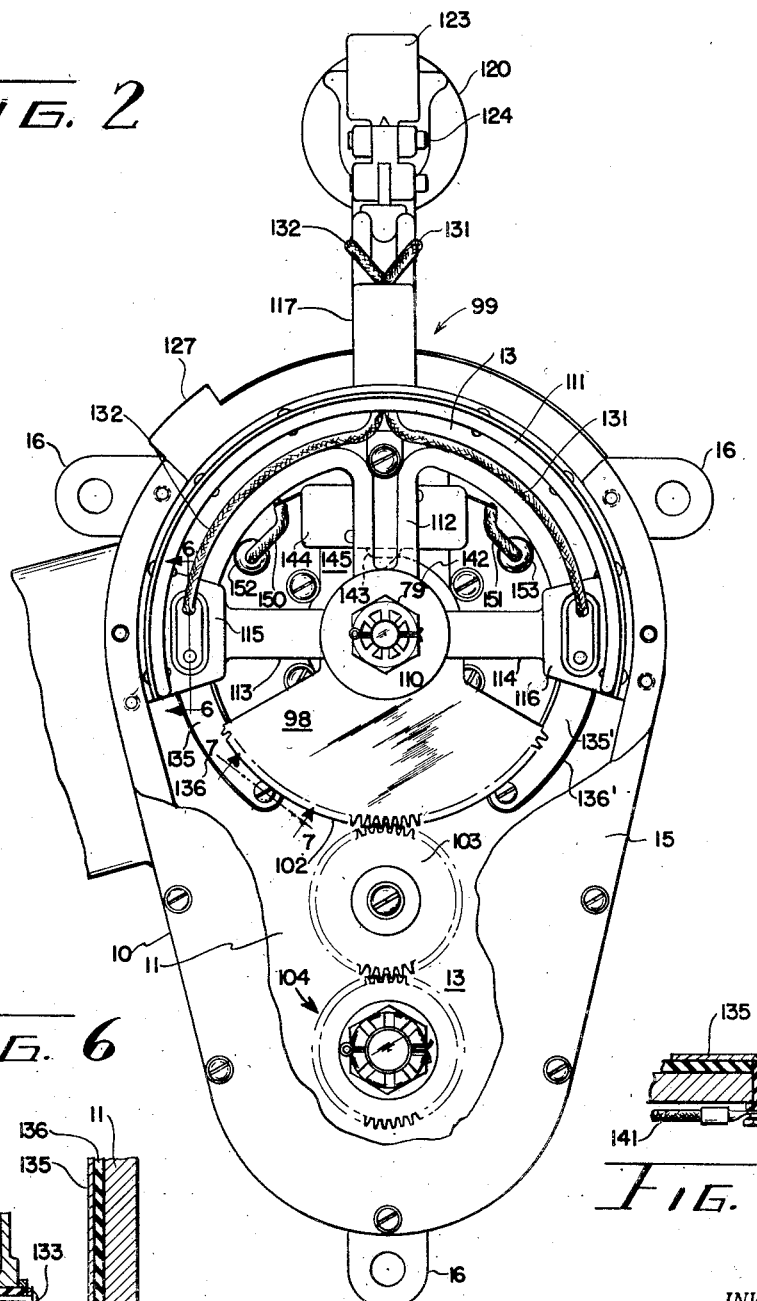

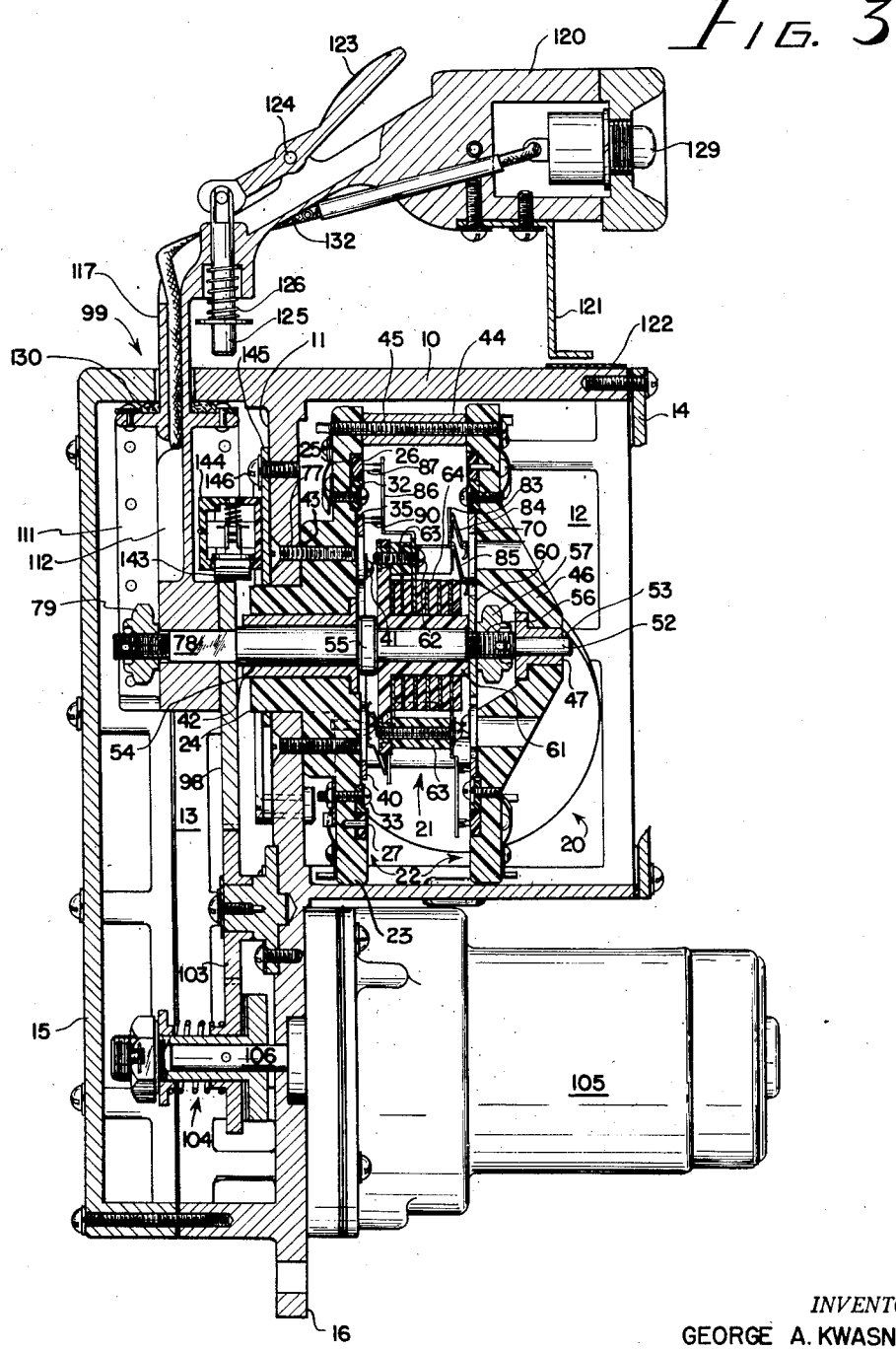

Jan. 7, 1958

G. A. KWASNIEWSKI 2,818,750

POWER CONTROLLERS

Filed May 31, 1951

INVENTOR.
GEORGE A. KWASNIEWSKI
BY
George H. Fisher
ATTORNEY

United States Patent Office 2,818,750
Patented Jan. 7, 1958

2,818,750
POWER CONTROLLERS

George A. Kwasniewski, Moundview Township, Ramsey County, Minn., assignor to Minneapolis-Honeywell Regulator Company, Minneapolis, Minn., a corporation of Delaware Application May 31, 1951, Serial No. 229,233

7 Claims. (Cl. 74—625)

This invention relates to the field of control apparatus, and more particularly to apparatus for use in the control of the power of aircraft. The provision of a single member for adjusting all the throttle and governor settings of the engines of an aircraft is not new. However, it has been found desirable to make it possible for the human pilot of a craft to select different sets of relationships between the throttle and governor settings over their ranges of adjustment, according as the craft is cruising or is preparing to land. The reasons for this, and the details of a complete power control apparatus including further variation in the limiting value of manifold pressure to be available, are discussed in the copending application, of Ross C. Alderson, Serial No. 206,578, filed January 18, 1951, now Patent No. 2,774,558, and assigned to the assignee of the present application.

It is a principal object of the present invention to provide a power controller adapted to perform the functions just described and having special features of safety and convenience.

It is an object of the invention to provide a power controller adapted for either motor or manual operation, in which the range through which the controller may be operated by the motor is releasably restricted.

It is an object of the invention to provide a power controller as described above in which manual operation of the controller may be effected beyond the range available for motor operation, by actuation of a stop release included in the manual operator of the controller.

It is an object of the invention to provide a power controller as described above in which means are provided to give a warning signal throughout any interval during which more than a selected portion of the maximum available power is being used.

Another object of the invention is to provide an improved controller assembly comprising a dual set of voltage dividers unitarily adjusted by a single shaft, in which the windings of the dividers are mounted on the inwardly directed faces of a pair of spaced discs, and the sliders of the dividers are angularly adjustable on the shaft, between the discs.

Various objects, advantages, and features of novelty which characterize my invention are pointed out with particularity in the claims annexed hereto and forming a part hereof. However, for a better understanding of the invention, its advantages, and objects attained by its use, reference should be had to the subjoined drawing, which forms a further part hereof and to the accompanying descriptive matter, in which I have illustrated and described a preferred embodiment of my invention. In the drawing:

Figure 2 is a rear view of the apparatus with the drive chamber cover partially broken away;

Figure 3 is a side elevation of the apparatus, mostly in section;

Figures 5, 6, and 7 show mechanical details of my controller.

Figure 1:
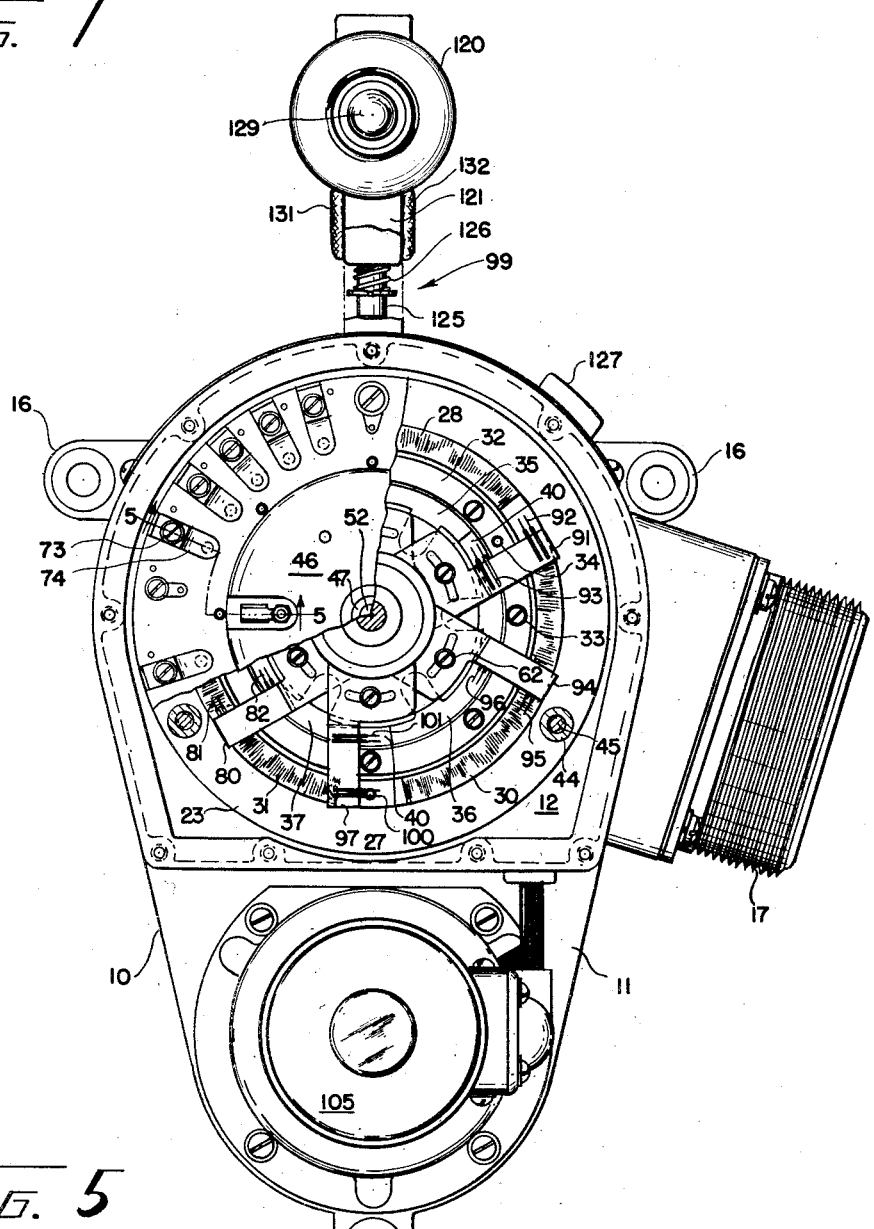
Figure 1 is a front view of the apparatus, with the control chamber cover removed and certain portions broken away.

The structure of my controller is best shown in Figures 1, 2, and 3, in which a housing 10 is shown to comprise a wall 11 separating a control chamber 12 from a drive chamber 13. A front cover 14 closes control chamber 12, and a rear cover 15 closes drive chamber 13. Housing 10 is further provided with mounting lugs 16, and with a multiple pin connector 17 whereby electrical connection may be made with the various electrical components contained within the housing.

Enclosed within control chamber 12 is a control assembly 20 comprising a rotor 21 and a stator 22. Stator 22 includes an inner mounting disc 23 having a mounting hub 24. Disc 23 is grooved at 25 to receive an annular form 26 upon which are wound three electrically independent windings 28, 30, and 31. Form 26 is secured to disc 23 by a clamping ring 32. Concentric with windings 28, 30, and 31 are a plurality of arcuate collector rings 35, 36, and 37 separated by insulating spacers 40. Rotation of form 26 in disc 23 is prevented by a pin 27. Disc 23 is bored centrally to receive a bearing 42, and is provided with a number of tapped holes 43 for mounting.

Separated from disc 23 by spacers 44, and fastened thereto by bolts 45, is an outer disc 46 bored centrally to receive a bearing 47. Like disc 23, the inner face of disc 46 is grooved to receive a winding form, a clamping ring, and a plurality of slip rings. The resistance windings on disc 46 are identified in Figure 4 by the reference numerals 48, 50, and 51.

Rotor 21 comprises a shaft 52 having spaced bearing surfaces 53 and 54 adapted to be received in bearings 47 and 42 respectively. Bearing surface 53 is of reduced diameter, and shaft 52 is formed with a central enlargement 55. Axial movement of the shaft with respect to discs 23 and 46 is thus prevented.

A portion of shaft 52 near bearing surface 53 is threaded as shown at 56 to receive a nut 57. When this nut is tightened, it compresses a washer 60 against a contact holder 61 to clamp the holder against enlargement 55 and thus fix it with respect to shaft 52. A short portion of holder 61 at the end which contacts enlargement 55 is of greatly increased diameter, and is provided at six equally spaced points around its periphery with threaded means for engaging a plurality of clamping screws 62. Each of these screws is effective to fasten a contact arm to holder 61 by means of a suitable spacer 63. Spacing washers 64 are provided to separate the contact arms where they encircle holder 61, and the arms are arcuately slotted as best shown in Figure 1 to permit their angular adjustment with respect to the holder. Each contact arm carries a first pair of contacts which engage one of the resistance windings, and a second pair of contacts which engage the associated slip ring. Thus, contact arm 80 carries contacts 81 which engage winding 31 and contacts 82 which engage slip ring 37. Contact arm 83 carries contacts 84 which engage winding 50, and contacts 85 which engage slip ring 70. Contact arm 86 carries contacts 87 which engage winding 28 and contacts 90 which engage slip ring 35. Contact arm 91 carries contacts 92 which engage winding 51 and contacts 93 which engage slip ring 71. Contact arm 94 carries contacts 95 which engage winding 30 and contacts 96 which engage slip ring 36. Contract arm 97 carries contacts 100 which engage winding 48 and contacts 101 which engage slip ring 68.

The angular extent of each winding on the annular form is 100 degrees, and the windings are equally spaced. All the contact arms move simultaneously as shaft 52 is rotated, and 90 degrees has been taken as a convenient maximum range of operation of the contact arms. Moreover, for purposes discussed in detail in the copending application referred to above, it is desirable that the change of voltage with position of the contact arms vary at other than lineal rates. This may be accomplished by connected fixed resistors of various magnitudes in parallel with different portions of the windings, by means of taps thereon. Thus, permanent connection must be made with each winding at two points 90 degrees apart, all the windings on disc 23 must be tapped at 68 degrees and 78 degrees, and all the windings on disc 46 must be tapped at 37.6 degrees, 51.2 degrees, 65 degrees, and 78 degrees.

Figure 5:
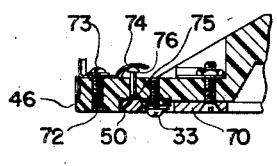

Connections are made to the windings in the following fashion. At each point around the circumference of the annular form receiving groove where it is desired to make a connection to a winding, a pair of radially aligned holes are formed in the disc in question. Figure 5 is a fragmentary section of disc 46 taken along the line 5—5 of Figure 1. The first of these two holes is indicated by the reference numeral 72, and is tapped to receive a machine screw 73 which holds a spring clip 74 against disc 46. The second hole, 75, is unthreaded, and serves to guide a contact pin 76 which is maintained in contact with the winding 50 by a spring portion of clip 74. The other end of clip 74 is formed into a wire receiving lug so that connection may be made to pin 76.

The assembly just described is mounted in an aperture in wall 11, and is maintained in place by suitable machine screws 77. A squared portion 78 of shaft 52 then extends into drive chamber 11, and held on this shaft by a nut 79 are a sector gear 98 and a handle assembly 99.

Sector gear 98 has a toothed portion 102 which is driven through an idler gear 103 and a friction clutch 104 by a motor 105 mounted on the outside of wall 11 with its drive shaft 106 extending within drive chamber 11. It will thus be apparent that operation of motor 105 may cause movement of the contact arms in control assembly 20 with respect to their windings.

Handle 99 is shown to comprise a central hub 110 and a semi-cylindrical surface 111 connected thereto by a central spoke 112 and a pair of diametrically opposite spokes 113 and 114 which include bosses 115 and 116 respectively. Central spoke 112 is extended beyond cylindrical surface 111, as shown at 117, and carries at its end a knob 120. An index 121 is carried by knob 120, and moves with respect to a scale 122 mounted on housing 10. A lever 123 is pivoted on knob 120 at 124, and when lever 123 is manually depressed, it raises a pin 125 which is slidably carried in knob 120, and which is normally urged downwardly as seen in Figure 3 by a compression spring 126.

Housing 10 is provided with a boss 127 positioned in the line of travel of pin 125 as knob 120 is operated, and of such a height that when pin 125 is in the position shown in Figures 1 and 3, it comes into engagement with boss 127 and prevents further motion of knob 120, but that when lever 123 is operated to lift pin 125, the end of the pin may pass over the top of boss 127, so that the limiting effect of the boss on the movement of handle 99 is removed. The dimensions of these parts and their relative location are such that pin 125 comes into engagement with boss 127 when handle 99 has been displaced from its zero position to its 78 degree position.

Housing 10 and cover 15 are provided with cooperating recesses which form a channel through which portion 117 of handle 99 may project. The insides of the cover and the housing are machined to a cylindrical surface, and a felt pad 130 is fastened to the cylindrical surface 111 of handle 99 to act as a resilient seal of the opening so formed.

A push button switch 129 is mounted in knob 120, and is connected by suitable conductors 131 and 132 which pass through the hollow portion 117 of handle 99 and to the inner side of the drive chamber. In order that continuous electrical connection may be made with the contacts of push button 129 regardless of the position of handle 99, conductor 132 is soldered to a rivet 133 which is insulated from boss 115 of handle 99 by suitable means, and which fastens thereto a spring contact 134, as best shown in Figure 6. Contact 134 continuously engages the surface of a slip ring 135 insulated from wall 11 of housing 10 by an insulating strip 136, and secured thereto by a machine screw 137 best shown in Figure 7 which traverses wall 11 through an insulating bushing 140, and to which electrical connection may be made by a suitable conductor 141. A like provision is made for conductor 131.

Sector gear 98 is provided with a camming portion 142 designed to cooperate with the actuator 143 of a miniature snap switch 144. Switch 144 is mounted on a metal plate 145 which is arranged to pivot about the hub of disc 23 where it extends into drive chamber 13, and which is secured in a desired pivotal position by a machine screw 146. Electrical connection is made to the terminals of switch 144 by conductors 150 and 151 which pass through grommets 152 and 153 in wall 11. Switch 144 is adjusted so that it is actuated when handle 99 has been displaced through 60 percent of its total movement.

Figure 4:
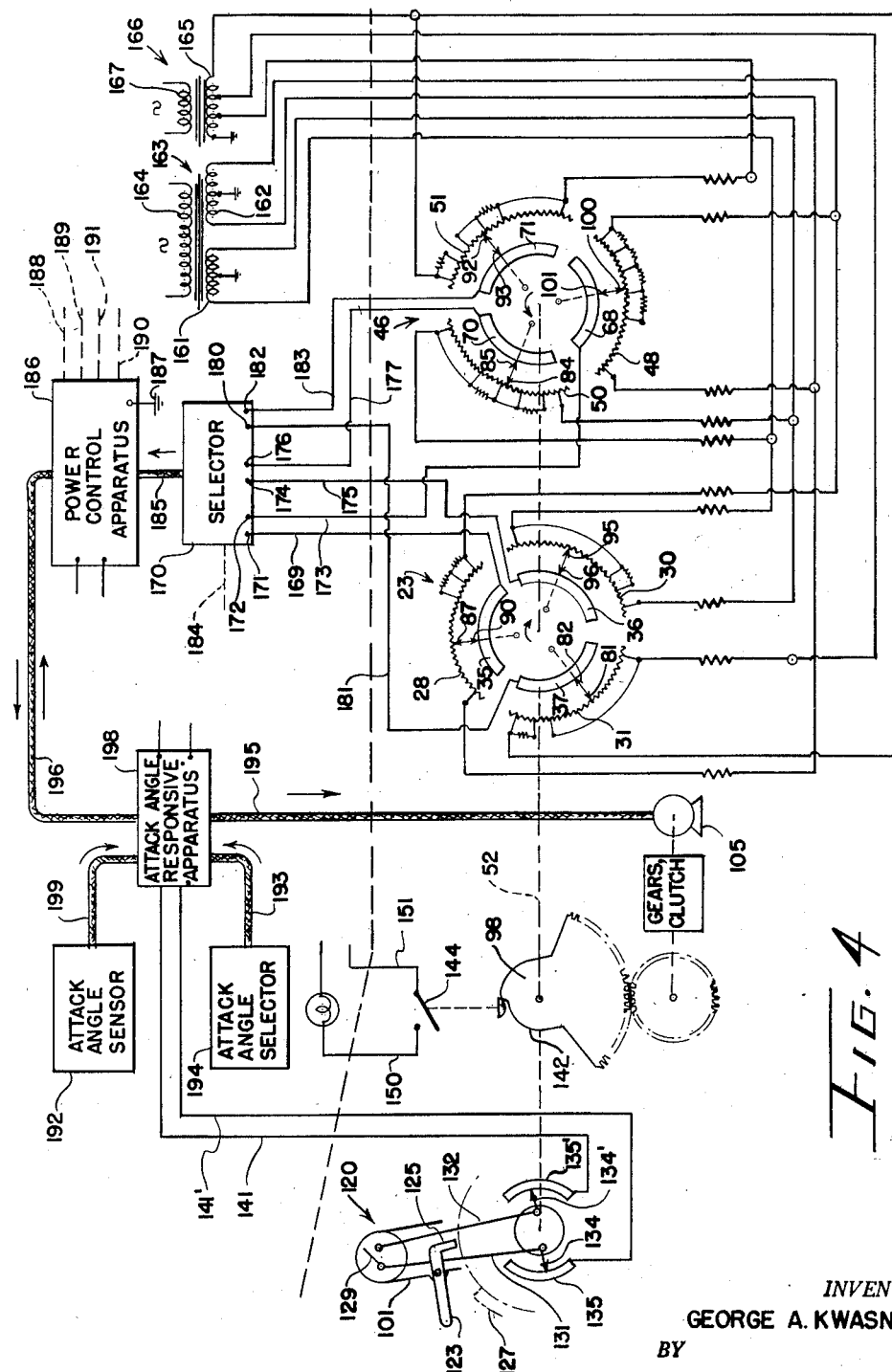
Figure 4 is a schematic showing of the controller together with simplified apparatus illustrating its utility.

The power controller just described is disclosed in Figure 4 in a simplified control apparatus. It will be seen that the windings on discs 23 and 46 are energized from the secondary windings 161 and 162 of a transformer 163 having a primary winding 164, and from the secondary winding 165 of a transformer 166 having a primary winding 167. Each secondary winding is provided with a grounded terminal. Resistors and shunts are connected across various portions of the winding on the discs to give their output voltages the desired characteristics, and the voltages appearing on the collector rings are supplied to a selector 170 as follows. Collector ring 35 on disc 23 is connected to terminal 171 of selector 170 by conductor 169, and collector ring 68 on disc 46 is connected to terminal 172 of selector 170 by conductor 173. Collector ring 36 on disc 23 is connected to terminal 174 of selector 170 by conductor 175, and collector ring 70 on disc 46 is connected to terminal 176 of selector 170 by conductor 177. Collector ring 37 on disc 23 is connected to terminal 180 on selector 170 by conductor 181, and collector ring 71 on disc 46 is connected to terminal 182 of selector 170 by conductor 183. Selector 170 is actuated by a suitable mechanical operator indicated at 184, to connect either terminals 171, 174, and 180 or terminals 172, 176, and 182 through a cable 185 to power control apparatus 186, which has a ground connection 187, and which in turn provides mechanical outputs 188 and 189 to control the throttle levers of the aircraft, and mechanical outputs 190 and 191 to control the engine governor levers of the aircraft.

There is also shown in Figure 4 an attack angle responsive apparatus 198 which is provided with a first input through a cable 199 from an attack angle sensor 192, and with a second input through a cable 193 from an attack angle selector 194. Motor 105 is shown as energized through a cable 195 from attack angle responsive apparatus 198, and power control apparatus 186 and attack angle responsive apparatus 198 are interconnected by a cable 196.

As completely disclosed in the copending application previously referred to, attack angle responsive apparatus 198 and power control apparatus 186 include switching means having three different controlling conditions. The first condition of the switching means is one in which attack angle responsive apparatus 198 is not energized and the signals from attack angle sensor 192 and attack angle selector 194 are without effect on the entire system, but in which power control apparatus 186 is energized and motor 105 is energized therefrom to position the power control sliders at a predetermined setting, the latter being fixed by suitable adjustment in the power control apparatus. The second condition of the switching means is one in which motor 105 is deenergized, so that power control apparatus 186 may be controlled through selector 170 by manual operation of handle 101 unopposed by motor 105. The third condition of the switching means is one in which attack angle responsive apparatus 198 provides a first signal through cable 196 to power control apparatus 186, and a second signal through cable 195 to motor 105, in accordance with any disagreement between the signals supplied by attack angle sensor 192 and attack angel selector 194, so that motor 105 continues in operation as long as the disagreement continues.

*Operation*

The operation of my power controller may be either manual or motor actuated, according to the condition of the switching means just described. For manual operation, the human pilot grasps handle 101 and rotates it in a clockwise direction as seen in Figure 4 to decrease power or in a counterclockwise direction to increase power. The range of operation of the handle from its most clockwise position to the point at which pin 125 engages boss 127 is the range from minimum flying power to full cruising power, so that the human pilot is prevented from inadvertently calling for excessive power during routine maneuvers. On the other hand, for taking off and for some military purposes it is necessary that absolute maximum power be available from the engines. Their life under such conditions is extremely short, so it is necessary to prevent these conditions from being set up inadvertently. Handle 101 can only be moved further in a counterclockwise direction, to increase power from full cruise to absolute maximum, by manipulation of lever 123. Thus the pilot is free to advance handle 101 without particular scrutiny, since he knows he cannot exceed the maximum cruising value because of the boss 127, yet in emergencies or on take off absolute maximum engine power is available to him instantly, without even moving his hand to a different control, simply by depressing lever 123.

It is equally important to prevent automatic adjustment of the power control into the absolute maximum power position, because the automatic controlling apparatus is incapable of distinguishing between emergencies and normal conditions, or of timing the interval of excessive power operation and reducing it as soon as possible to extend the life of the engines. Hence boss 127 and pin 125 are placed on the power controller in the positions shown, so that at no time can motor operation of the controller call for more than full cruising power.

In non-automatic flight the human pilot sets the mixture controls for the engines at "automatic lean" and leaves them there. For normal ranges of power this is perfectly satisfactory. As the throttles and R. P. M. levers are advanced, more and more power is demanded from the engines and their temperatures accordingly rise. There comes a time when engine temperature approaches a dangerous value, and further power can be obtained safely only if additional means can be found to cool the engine. The human pilot can accomplish this cooling function by making the mixture richer, and he normally does so when the craft is being flown manually. When the power is being controlled automatically, however, and the human pilot simply sets such a control as attack angle selector 194, it is possible that the necessity of the mixture setting change may not occur to him.

To care for this contingency a warning lamp is energized from a suitable source of electricity through a circuit which is completed by switch 144. As long as lever 101 is in such a position as to call for less than 60 percent of the maximum cruising power, switch 144 remains open, but when lever 101 is advanced beyond this point, the camming portion of sector gear 98 closes switch 144, completing the energizing circuit for the warning lamp and thus calling the pilot's attention to the need for adjusting the mixture setting.

Numerous objects and advantages of my invention have been set forth in the foregoing description, together with details of the structure and function of the invention, and the novel features thereof are pointed out in the appended claims. The disclosure, however, is illustrative only, and I may make changes in detail, especially in matters of shape, size, and arrangement of parts, within the principle of the invention, to the full extent indicated by the broad general meaning of the terms in which the appended claims are expressed.

I claim as my invention:

1. Apparatus of the class described comprising, in combination: control means adjustable through a range of motion to vary a condition; manual means and motor means for causing adjustment of said control means; means limiting the range through which said control means can be adjusted by said motor means and said manual means; and means included in said manual means for disabling said limiting means so that said control means can be manually adjusted throughout its entire range.

2. Apparatus of the class described comprising, in combination: a housing; a control member pivotally mounted in said housing for adjustment through a range of motion; manual means extending outwardly of said housing for operating said control member; motor actuated means within said housing for operating said manual means to adjust said control member; cooperating means carried by said housing and said manual means to limit the motion of said manual means and hence the adjustment of said control member to a portion of said range of motion; and means included in said manual means for disabling said limiting means so that said control means can be manually adjusted throughout its entire range.

3. Apparatus of the class described comprising, in combination: control means adjustable through a range of motion to vary a condition; manual means and motor means for causing adjustment of said control means; means limiting the range through which said control means can be adjusted by said motor means; means included in said manual means for disabling said limiting means so that said control means can be manually adjusted throughout its entire range; signalling means; and means comprised in said control means for actuating said signalling means throughout a selected portion of said range.

4. Apparatus of the class described comprising, in combination: control means adjustable through a range of motion to vary a condition; manual means for causing adjustment of said control means; motor means for causing adjustment of said manual means; means normally limiting the range of adjustment of said manual means to less than the full range of movement of said control means, to restrict the maximum adjustment of said control means which can be produced by said motor means; and means included in said manual means for disabling said limiting means so that said control means can be manually adjusted throughout its entire range.

5. Apparatus of the class described comprising, in combination: a housing; a control member pivotallly mounted in said housing for adjustment through a range of motion; manual means extending outwardly of said housing for operating said control member; motor actuated means within said housing for operating said manual means to adjust said control member; a retractable element carried by said manual means; a boss projecting from said housing for engagement by said element to limit the movement of said manual means and hence the amount of adjustment of said control member by said motor means to a portion of said range of motion; and means included in said manual means for retracting said element out of engagement with said boss so that said control means can be manually adjusted throughout its entire range.

6. Apparatus of the class described comprising, in combination: a housing having a wall separating a control chamber from a drive chamber; a unitary control assembly having a control shaft; means mounting said assembly in said control chamber with said shaft projecting through said wall into said drive chamber; manual means for positioning said shaft, including a handle extending outwardly of said drive chamber; motor means mounted on said wall external of both said chambers, with the drive shaft thereof extending into said drive chamber; means frictionally connecting said motor means in driving relation to said shaft so that upon operation of said motor said control assembly and the position of said manual means are simultaneously adjusted; cooperating stop elements carried by said handle and said housing to limit the amount of said adjustment; and means for manually displacing one of said stop elements to increase the available range of said adjustment.

7. Control apparatus comprising, in combination: a housing; a shaft to be driven; drive means for said shaft including a handle extending out of said housing, a cam, and a gear sector; means mounting said drive means on said shaft for rotation unitary therewith; motor actuated means engaging said gear sector to cause operation of said drive means; means carried by said handle and said housing for engagement to limit the movement of said handle and hence the movement of said drive means; and electrical control means including means adapted to be displaced by said cam when said shaft has rotated a predetermined amount mounted in said housing for actuation by said cam means prior to engagement of said stops.

References Cited in the file of this patent
UNITED STATES PATENTS

| | | | |
|---|---|---|---|
| 1,299,778 | Pukerud | Apr. 8, | 1919 |
| 1,983,225 | Gregg | Dec. 4, | 1934 |
| 2,071,177 | Puffer | Feb. 16, | 1937 |
| 2,217,364 | Halford et al. | Oct. 8, | 1940 |
| 2,358,363 | Truesdell | Sept. 19, | 1944 |
| 2,370,025 | Edelman | Feb. 20, | 1945 |
| 2,388,681 | Deschamps | Nov. 13, | 1945 |
| 2,512,880 | Russell | June 27, | 1950 |
| 2,550,314 | Winckler | Apr. 24, | 1951 |
| 2,563,822 | Dolza et al. | Aug. 14, | 1951 |
| 2,672,851 | Jorgenson et al. | Mar. 23, | 1954 |